United States Patent [19]

Natsuume et al.

[11] Patent Number: 4,906,298
[45] Date of Patent: Mar. 6, 1990

[54] HYDRAULIC CEMENT COMPOSITION

[75] Inventors: Tadao Natsuume, Tokyo; Hiromitsu Kadono, Yokohama; Yoshiaki Miki, Kawasaki, all of Japan

[73] Assignee: Nippon Zeon Co., Ltd., Tokyo, Japan

[21] Appl. No.: 228,823

[22] Filed: Aug. 2, 1988

Related U.S. Application Data

[63] Continuation of Ser. No. 809,867, Dec. 17, 1985, abandoned.

[30] Foreign Application Priority Data

| Dec. 21, 1984 | [JP] | Japan | 59-270323 |
| Jan. 31, 1985 | [JP] | Japan | 60-17427 |
| Feb. 21, 1985 | [JP] | Japan | 60-33367 |
| Mar. 8, 1985 | [JP] | Japan | 60-45840 |
| Mar. 8, 1985 | [JP] | Japan | 60-45841 |

[51] Int. Cl.$^4$ .............................................. C04P 7/02
[52] U.S. Cl. ................................... 106/97; 106/90; 106/314
[58] Field of Search ........................... 106/90, 314, 97

[56] References Cited

U.S. PATENT DOCUMENTS

| 4,015,993 | 4/1977 | Natsuume | 106/90 |
| 4,042,407 | 8/1977 | Natsuume | 106/90 |
| 4,125,410 | 11/1978 | Natsuume | 106/90 |
| 4,586,960 | 5/1986 | Iizuka et al. | 106/90 |
| 4,746,365 | 5/1988 | Babcock et al. | 106/90 |
| 4,792,360 | 12/1988 | Pierce et al. | 106/90 |

FOREIGN PATENT DOCUMENTS

| 58-135168 | 8/1983 | Japan . | |
| 60-16850 | 1/1985 | Japan . | |
| 60-16851 | 1/1985 | Japan | 106/90 |
| 60-42265 | 3/1985 | Japan | 106/314 |

Primary Examiner—Brian E. Hearn
Assistant Examiner—Andrew Griffis
Attorney, Agent, or Firm—Sherman & Shalloway

[57] ABSTRACT

A hydraulic cement composition comprising hydraulic cement and a copolymer of 60 to 85 mol % of an alpha,-beta-unsaturated dicarboxylic acid and 40 to 15 mol % of an olefin or a water-soluble salt thereof, said copolymer having a number average molecular weight of 300 to 10,000 and containing not more than 10% by weight of a high-molecular-weight polymer having a molecular weight of at least 20,000.

25 Claims, No Drawings

HYDRAULIC CEMENT COMPOSITION

This application is a continuation of application Ser. No. 809,867 filed 12/17/85, abandoned.

This invention relates to a novel hydraulic cement composition, and more specifically, to a hydraulic cement composition comprising hydraulic cement and a novel polycarboxylic acid-type additive having excellent properties for use as a dispersing agent, a water-reducing agent, a super plasticizer, etc.

Generally, additives called a dispersing agent, a water-reducing agent or a super plasticizer are used in the making of concrete, mortar, paste, etc. using cement. These additives are expected, for example, (1) to increase the workability of a cement mixture still in the non-set state or to decrease the amount of water to be used to obtain the same workability, (2) to increase the strength of cement after application as a result of decreasing the amount of water used, or to decrease the amount of cement to be used to obtain the same strength, and (3) to increase water tightness.

Such additives known heretofore include, for example, ligninsulfonic acid-type admixtures, hydroxycarboxylic acid-type admixtures, beta-naphthalenesulfonic acid-formaldehyde condensate-type admixtures, a melaminesulfonic acid-formaldehyde condensate-type admixtures, and olefin/alpha, beta-unsaturated dicarboxylic acid copolymer-type admixtures (the last one will be sometimes referred to simply as polycarboxylic acid-type admixtures). Particularly, the polycarboxylic acid-type admixtures show good dispersibility and flowability even in small quantities and also have excellent slump retention, and much research on this type of cement admixture has been conducted recently (see, for example, U.S. Pat. No. 4,042,407, Japanese Laid-Open Patent Publication No. 213,663/1983, etc.). Even these polycarboxylic acid-type admixtures do not fully meet the increasingly rigorous requirements for dispersibility and flowability and slump retention, and are strongly desired to be improved.

It is an object of this invention to provide an improved cement admixture which meets such requirements.

Investigations of the present inventors made in order to achieve the above object have now led to the discovery that when a polycarboxylic acid-type additive having a specific composition with a low content of a high-molecular-weight polymer is used, a cement composition having good cement dispersibility and flowability and good workability with a markedly inhibited slump decrease and a hardened cement product having high strength can be obtained as compared with the case of using known polycarboxylic acid-type additives.

Thus, according to this invention, there is provided a hydraulic cement composition comprising hydraulic cement and a copolymer of 60 to 85 mole % of an alpha, beta-unsaturated dicarboxylic acid and 40 to 15 mole % of an olefin or a water-soluble salt thereof as an additive, said copolymer having a number average molecular weight of 300 to 10,000 and containing not more than 10% by weight of a high-molecular-weight polymer having a molecular weight of at least 20,000.

The copolymer used as the additive in this invention is composed of (a) 60 to 85 mole %, preferably 65 to 80 mole %, of an alpha, beta-unsaturated dicarboxylic acid and (b) 40 to 15 mole %, preferably 35 to 20 mole %, of an olefin and has a number average molecular weight of 300 to 10,000, preferably 1,000 to 8,000. The content of a high-molecular weight polymer having a molecular weight of at least 20,000 in the copolymer is adjusted to not more than 10% by weight, preferably not more than 8% by weight.

The number average molecular weight is measured by high-performance liquid chromatography (tetrahydrofuran solvent, measuring temperature 40° C.) based on the number average molecular weight of polystyrene.

This copolymer is characterized by the fact that the amount of the alpha, beta-unsaturated dicarboxylic acid units constituting the copolymer is larger, and the content of a high-molecular-weight polymer is lower, than the known polycarboxylic acid-type cement admixtures. Because of this characteristic, the copolymer imparts better dispersibility and flowability and slump retention to cement than the prior art.

The copolymer tends to show better properties as its molecular weight distribution is narrower. Preferably, the copolymer of this invention has a weight average molecular weight/number average molecular weight ratio, Mw/Mn, of not more than 2.0, particularly not more than 1.9.

Specific examples of the component (a) of the copolymer include maleic acid, itaconic acid, citraconic acid, and anhydrides of these. Maleic anhydride is industrially advantageous.

Specific examples of the component (b) include aliphatic olefins having 2 to 10 carbon atoms such as ethylene, propylene, isobutylene, butene-1, butene-2, pentene-1, pentene-2, 2-methylbutene-2, 4-methylpentene-1 and hexene-1; and cycloolefins having 4 to 10 carbon atoms such as cyclobutene, cyclopentene, cyclhexene, cycloheptene, cyclooctene, cyclopentadiene, dicyclopentadiene, 2-ethyl-5-norbornene, 2-cyano-5-norbornene and 2-acetyl-5-norbornene. Of these, aliphatic olefins having 4 to 6 carbon atoms and cycloolefins having 4 to 6 carbon atoms are preferred. As required, two or more of these olefins may be used in combination.

The copolymer of this invention may have a vinyl monomer such as acrylic acid, vinyl acetate, methyl methacrylate, methyl vinyl ether, acrylonitrile and ethylene-sulfonic acid as an additional component copolymerized therein. Or the carboxyl groups and/or acid anhydride groups may partly be esterified or amidated.

There is no particularly restriction on the method of producing the copolymer, and any methods by which the copolymer of the above properties can be obtained may be used in this invention. For example, the olefin and the alpha, beta-unsaturated dicarboxylic acid in an amount excessive with respect to the olefin are polymerized in the presence of a radical generator, and a polymer having a high molecular weight is removed by ultrafiltration or by using an extraction solvent.

When the resulting copolymer is water-soluble, it can be used directly. Usually, to increase its water solubility, the copolymer is used after some or all of the carboxyl groups and/or acid anhydride groups present in the copolymer are converted to salts by using monovalent or polyvalent cations. Specific examples of such salts are salts with alkali metals such as sodium and potassium, salts with alkaline earth metals such as magnesium, calcium and barium, an ammonium salt, salts with amines such as trimethylamine, triethylamine and triethanolamine, and combinations of these salts. Of these, the alkali metal salts are especially preferred from the standpoint of economy, safety and dispersibiity.

The use of the alkali metal salt in combination with the calcium salt achieves further improvement in dispersibility and flowability and slump retention. In this case, the calcium salt is used in an amount of 0.05 to 1 equivalent, preferably 0.1 to 0.8 equivalent, per equivalent of the alkali metal salt.

In the present invention, there is no particular restriction on the form in which the copolymer or its water-soluble salt is used. It may be used as an aqueous solution or a solid such as a powder either singly or in combination with another cement admixture. Examples of the other cement admixture include conventional cement dispersants, air entraining agents, cement wetting dispersants, expanding agents, water-proofing agents, strength increasing agents, setting accelerators, and setting retarders. Particularly, the copolymer of this invention exhibits much better properties when used in combination with aromatic sulfonic acid salt-type admixtures, melaminesulfonic acid-formaldehyde condensate-type admixtures or ligninsulfonic acid-type admixtures widely used as cement dispersing agents, water-reducing agents or superplasticizers. Effects obtained by using a combination of the polycarboxylic acid-type admixture and the aforesaid sulfonic acid group-containing additives have been known (for example, U.S. Pat. No. 4,125,410 and Japanese Patent Publication No. 50740/1982). The aforesaid combined use in accordance with this invention brings about higher levels of improvement in broader mixing proportions than the above known combined use of additives (see Examples 9 to 14 given hereinbelow).

Aromatic sulfonic acid salts or water-soluble compounds containing units of the aromatic sulfonic acid salts in the molecule, which are effective as dispersing agents, water-reducing agents or superplasticizers may be used as the aromatic sulfonic acid salt-type admixtures. Examples include (1) water-soluble salts of condensation products between aliphatic aldehydes such as formaldehyde and sulfonated mononuclear or polynuclear fused aromatic hydrocarbons such as benzene, naphthalene, fluorene, anthracene, phenanthrene, pyrene, naphthacene, pentacene, coronene, hexacene, heptacene, octcene, nonacene, decacene, undecacene, dodecacene and acenaphthene, sulfonated derivatives thereof having 1 or 2 substituents such as $-NH_2$, $-OH$, $-COOH$, methyl or ethyl, or sulfonated products of aromatic hydrocarbon mixtures such as creosote oil and petroleum cracking products (see, for example, Japanese Patent Publications Nos. 9443/1960, 11737/1966, 26249/1965 and 39208/1972, and Japanese Laid-Open Patent Publications Nos. 104919/1974, 69824/1974, 89423/1975 and 29644/1975); (2) water-soluble salts of condensation products obtained by condensing the aforesaid sulfonated products with aliphatic aldehydes and at this time, replacing part of the sulfonated products by the aforesaid aromatic compounds containing no sulfonic acid group, melamine or urea (for example, Japanese Laid-Open Patent Publication No. 58120/1975); (3) water-soluble salts of sulfonated products of polynuclear fused aromatic hydrocarbons having at least 3 aromatic rings selected from the above-exemplified aromatic hydrocarbons. The water-soluble salts may, for example, salts with alkali metals, alkaline earth metals or lower amines such as methylamine or morpholine.

The melaminesulfonic acid-formaldehyde type additive used is a salt of a condensate between melaminesulfonic acid and formaldehyde and is commercially available. For example, it is commercially available under tradenames MELMENT (Showa Denk Co., Ltd.), and NL-4000 and NP-20 (Pozzolith Bussan Co., Ltd.). The melaminesulfonic acid-formaldehyde condensate salt can be produced generally by the addition reaction of melamine, formaldehyde or paraformaldehyde, and a sulfite such as sodium sulfite, ammonium sulfite, sodium bisulfite or ammonium bisulfite in water under alkaline conditions (for example, at a pH of about 9 to 12); or by condensing under weakly acidic conditions (for example, at a pH of 4 to 6) the addition-reaction product so obtained under alkaline conditions; or by condensing under strongly acidic conditions (for example, at a pH of 2 to 4) the addition-reaction product so obtained under alkaline conditions. Products obtained by partly replacing melaminesulfonic acid by urea, phenol, phenolsulfonic acid, etc. during the condensation by the above method can also be used in this invention. These condensates are used in the form of a water-soluble salts such as alkaline metal salts, alkaline earth metal salts or lower amine salts such as methylamine and morpholine salts.

Any ligninsulfonic acid-type additives may be used which can improve the dispersibility and water-reducing property of cement. Specific examples include (1) a product obtained by fermenting the sulfite pulp spent liquor with an enzyme or an alcohol to decrease its reduced sugar content, (2) a product obtained by adding slaked lime to the above spent liquor to convert ligninsulfonic acid to its insoluble basic salt, and fractionating and recovering the sugars in the spent liquor, (3) a product obtained by heating the above spent liquor in the presence of slaked lime to render the sugars non-detrimental to the setting of concrete, and (4) ligninsulfonates free from the defects of the conventional ligninsulfonates, namely their air-entraining property, setting retardation and pseudosetting property, etc. These new ligninsulfonates preferably contain not more than 25% by weight of a low-molecular-weight polymer having a molecular weight of not more than 2,000, not more than 40% by weight of a high-molecular-weight polymer having a molecular weight of at least 10,000, and not more than 2.5% by weight of sugars. These ligninsulfonates can be obtained by treating an ordinary ligninsulfonic acid-containing liquid by a known method, for example an ultrafiltration method utilizing a semipermeable membrane.

The amount of the sulfonic acid group-containing additive to be used in combination may, for example, be 5 to 95%, preferably 20 to 80%, more preferably 30 to 70%, based on the total weight of the copolymer or its water-soluble salt and the above additive.

The amount of the copolymer or its water-soluble salt used in this invention may be selected according to the required properties. It is usually 0.01 to 3% by weight, and preferably 0.05 to 1% by weight, based on the solids content of cement. As this amount decreases, the effect of improving workability decreases. If, on the other hand, it is excessively large, the setting of cement will sometimes be adversely affected.

The time of adding the copolymer or its water-soluble salt to cement can be selected as desired according to the purpose of using cement. For example, it may be pre-mixed with cement; added at the time of kneading a cement composition such as concrete; added after water and other admixtures have been added to cement and the stirring of the mixture has been started; or added after the cement composition has been kneaded and a suitable period of time has elapsed. A particularly marked effect can be obtained when it is added at the time of kneading the cement composition.

There is no particular limitation on the type of cement to which the the copolymer or its water-soluble salt in accordance with this invention can be applied as a hydraulic cement admixture. Specific examples include ordinary portland cement, high early strength portand cement, moderate heat-of-hardening portland cement, alumina cement, fly ash cement, blast furnace cement, silica cement, slag cement, and various mixed cements.

Thus, the present invention can provide a hydraulic cement composition having good workability with good cement dispersibilty and flowability and markedly reduced slump decrease, and enables a hardened product of high strength to be obtained from it.

The following examples illustrate the present invention more specifically. All parts and percentages in these examples are by weight unless otherwise specified.

REFERENTIAL EXAMPLE 1

A 1-liter autoclave was charged under a nitrogen atmosphere with 98 parts of maleic anhydride, 110 parts of a $C_5$ olefin mixture shown in Table 1, 4 parts of benzoyl peroxide and 400 parts of benzene, and the mixture was heated with stirring at 70° to 75° C. for 8 hours. After the reaction, the precipitated copolymer was collected by filtration and dried to obtain a $C_5$-olefin/maleic anhydride copolymer (I).

The composition, number average molecular weight and weight average molecular weight of the copolymer and its content of a high-molecular-weight polymer having a molecular weight of at least 20,000 were measured. The results are shown in Table 2.

TABLE 1

| | |
|---|---|
| iso-pentane | about 16% |
| n-pentane | about 15% |
| 2-methylbutene-1 | about 42% |
| pentene-1 | about 27% |
| isoprene | less than 0.1% |

REFERENTIAL EXAMPLE 2

Referential Example 1 was repeated except that 98 parts of maleic anhydride and 76 parts of the $C_5$-olefin mixture were used. The properties of the resulting copolymer (II) are shown in Table 2.

REFERENTIAL EXAMPLE 3

The copolymer (II) obtained in Referential Example 2 was ultrafiltered by using a membrane whose separation limit molecular weight was 20,000, thereby to remove a high-molecular-weight polymer. The properties of the resulting copolymer (III) are shown in Table 2.

REFERENTIAL EXAMPLE 4

A copolymer was prepared in the same way as in Referential Example 1 except that 98 parts of maleic anhydride and 26 parts of the $C_5$-olfein mixture were used. The resulting polymer was then ultrafiltered in the same way as in Referential Example 3 to obtain a copolymer (IV). The properties of the copolymer (IV) are shown in Table 2.

TABLE 2

| Copolymer | Control | | Invention | |
|---|---|---|---|---|
| | (I) | (II) | (III) | (IV) |
| Composition (mole %) (*1) | | | | |
| Maleic anhydride | 50 | 65 | 65 | 80 |
| $C_5$-olefins | 50 | 35 | 35 | 20 |
| Molecular weight (*2) | | | | |
| Number average molecular weight (Mn) | 14,000 | 12,000 | 6,500 | 1,500 |
| Weight average molecular weight (Mw) | 31,000 | 26,000 | 11,700 | 2,400 |
| Mw/Mn | 2.2 | 2.2 | 1.8 | 1.6 |
| Content (%) of a high-molecular-weight polymer (*3) | 17 | 14 | 8 | 1 |

(*1): Calculated from the ratio of nitrogen, hydrogen and carbon measured by an element analyzer (Model CHN-1A made by Shimadzu Seisakusho Co., Ltd.).
(*2): Molecular weight determined by a high-performance liquid chromatografic device (made by Toyo Soda Co., Ltd.) and calculated for polystyrene (column: G3000H × 1.5 m, column temperature: 40° C., solvent: tetrahydrofuran, thesolvent flow rate: 1.3 cc/min., detecting section: RI-8).
(*3): Calculated from the total area and an area having a molecular weight of at least 20,000 on the chart.

(*1): Calculated from the ratio of nitrogen, hydrogen and carbon measured by an element analyzer (Model CHN-1A made by Shimadzu Seisakusho Co., Ltd.).

(*2): Molecular weight determined by a high-performance liquid chromatografic device (made by Toyo Soda Co., Ltd.) and calculated for polystyrene (column: G3000Hx1.5m, column temperature: 40° C., solvent: tetrahydrofuran, the solvent flow rate: 1.3 cc/min., detecting section: RI-8).

(*3): Calculated from the total area and an area having a molecular weight of at least 20,000 on the chart.

EXAMPLE 1

The properties of the sodium salts of the copolymers obtained in Referential Examples as a hydraulic cement admixture were evaluated under the following mortar testing conditions. The results are shown in Table 3.

Mortar test

A cement mortar of the following formulation was prepared, and a mortar test was conducted in accordance with JIS-R-5201 (the amount of the cement admixture was adjusted so as to provide a flow of 230±5 mm).

The amount of air entrained was measured in accordance with JIS-A-1116. The mortar temperature was set at 20°±2° C. The temperature at which the mortar was aged in water for preparation of a sample for compression strength was adjusted to 20°±2° C.

Cement: Asano ordinary portland cement
Sand: Sand occurring in Oi River, Japan

Formulation

Cement: 600 parts
Sand: 1200 parts
Water: 210 parts (total amount including the amount of water in the cement admixture shown in Table 3)
Cement admixture: As per Table 3.
Cement/sand ratio=1/2
Cement/water ratio=1/0.35.

TABLE 3

| Run No. | Admixture | Amount of the admixture (solids, %) | Flow value (mm) (*2) | | | Amount of air (%) | | Compression strength (kg/cm$^2$) (*3) | |
|---|---|---|---|---|---|---|---|---|---|
| | | | Immediately after | 30 min. later | 60 min. later | Immediately after | 60 min. later | 3 days later | 28 days later |
| Invention | | | | | | | | | |
| 1 | Copolymer (III) | 0.20 | 230 | 220 | 210 | 4.2 | 3.5 | 295.0 | 493.0 |
| 2 | Copolymer (IV) | 0.15 | 230 | 225 | 220 | 4.0 | 3.7 | 293.5 | 494.5 |
| Comparison | | | | | | | | | |
| 3 | Not added | — | 170 | — | — | 1.3 | — | 286.0 | 480.0 |
| 4 | Commercial (*1) | 0.50 | 229 | 180 | — | 4.5 | 2.8 | 289.5 | 483.0 |
| 5 | Copolymer (I) | 0.45 | 229 | 190 | 170 | 4.7 | 3.8 | 290.0 | 481.0 |
| 6 | Copolymer (II) | 0.40 | 230 | 195 | 180 | 4.1 | 3.3 | 289.0 | 482.5 |

(*1): Sodium salt of β-naphthalenesulfonic acid/formalin condensate (commercially available under the tradename "Mighty FD$_2$", a product of Kao Soap Co., Ltd.)
(*2): After kneading and standing for the specified period of time, the mixture was stirred for 30 seconds and its flow value was measured.
(*3): Evaluated with regard to a test specimen sampled after the flow value at 60 minutes was measured.

The results shown in Table 3 demonstrate that the admixture in accordance with this invention gives good workability over a long period of time when used in a smaller amount than conventional dispersing agents, and also gave good results in the compression strength of a hardened product obtained from the hydraulic cement mixture of the invention.

EXAMPLE 2

The copolymers (I), (III), and (IV) were tested in high-strength concrete composition under the following concrete testing conditions. The results are shown in Table 4.

Concrete test

Cement, water, aggregate and hydraulic cement admixture were mixed in accordance with the following formulation, and kneaded for πseconds by a forced kneading mixer. The slump and the amount of air of the resulting concrete were measured. Thereafter, the concrete was again kneaded 30 minutes and 60 minutes later. A sample for the measurement of compression strength was taken 60 minutes later. The amount of the admixture was adjsuted so that immediately after kneading the slump became 20±1 cm. The slump was measured in accordance with JIS A1101; the amount of air was measured in accordance with JIS A1106; and the compression strength was measured in accordance with JIS A1108. The concrete temperature was adjusted to 20°±2° C., and the temperature at which the concrete was aged in water to prepare the sample for the measurement of compression strength was adjusted to 20°±2° C.

Concrete formulation

Cement: 450 kg/m$^2$ Asano ordinary porland cement
Coarse aggregate: 1006 kg/m$^2$ crushed stone (maximum particle diameter 25 mm)
Fine aggregate: 747 kg/m$^2$ Sand occurring in Oi River
Water: 162 kg/m$^2$ (the total amount including the amount of water in the admixture
Hydraulic cement admixture: shown in Table 4
Water/cement ratio=36/100
Proportion of fine aggregate=43%.

TABLE 4

| Run No. | Admixture | Amount of the admixture (solids, %) | Flow value (mm) (*2) | | | Amount of air (%) | | Compression strength (kg/cm$^2$) (*3) | |
|---|---|---|---|---|---|---|---|---|---|
| | | | Immediately after | 30 min. later | 60 min. later | Immediately after | 60 min. later | 3 days later | 28 days later |
| Invention | | | | | | | | | |
| 1 | Copolymer (III) | 0.25 | 20.3 | 18.7 | 17.0 | 2.5 | 2.0 | 297.0 | 495.0 |
| 2 | Copolymer (IV) | 0.20 | 20.1 | 18.1 | 16.7 | 2.7 | 1.8 | 297.5 | 495.7 |
| Comparison | | | | | | | | | |
| 3 | Copolymer (I) | 0.44 | 20.1 | 16.8 | 11.0 | 2.8 | 1.7 | 291.5 | 490.0 |
| 4 | Commercial (*) | 0.55 | 20.3 | 13.3 | 9.5 | 2.1 | 1.8 | 293.0 | 490.5 |

(*): Same as footnote (*1) to Table 3.

The results shown in Table 4 demonstrate that the admixture in accordance with this invention shows sufficient water-reducing property when used in a smaller amount than the conventional admixture, and is far superior to the conventional admixture in slump retention.

EXAMPLE 4

The copolymer (I), (III) and (IV) were evaluated in a general concrete formulation shown below. The results are shown in Table 5.

Concrete formulation

Cement: 300 kg/m$^2$ Asano ordinary porland cement
Coarse aggregate: 1012 kg/m$^2$ crushed stone (maximum particle diameter 25 mm)
Fine aggregate: 815 kg/m$^2$ Sand occurring in Oi River
Water: 166.0 kg/m$^2$ (the total amount including the amount of water in the admixture)
Hydraulic cement admixture: shown in Table 5
Water/cement ratio=55.3/100
Proportion of fine aggregate=44.6%

Slump desired: 10±1 cm
Desired amount of air: 4.5±0.5% (Air amount adjusting VINSOL Yamaso Chemical Co., Ltd.)

TABLE 5

| Run No. | Admixture | Amount of the admixture (solids, %) | Slump (cm) | Amount of air (%) | Compression strength (kg/cm$^2$) 3 days later | 28 days later |
|---|---|---|---|---|---|---|
| Invention | | | | | | |
| 1 | Copolymer (III) | 0.07 | 10.5 | 4.7 | 119.0 | 309.7 |
| 2 | Copolymer (IV) | 0.07 | 10.3 | 4.5 | 119.7 | 310.0 |
| Comparison | | | | | | |
| 3 | Copolymer (I) | 0.10 | 10.0 | 5.0 | 118.5 | 308.0 |
| 4 | Commercial (*) | 0.25 | 10.1 | 4.8 | 120.8 | 309.5 |

(*): Commercial ligninsulfonic acid salt (POZZOLITH #5L, Nisso Master Builders Co., Ltd.)

Table 5 shows that even in a general-purpose concrete formulation, the admixture of this invention shows good properties when used in a smaller amount than the conventional admixture.

EXAMPLE 5

Example 1 was repeated except that the sodium salt of a copolymer (V) of 65 mole % of maleic anhydride and 35 mole % of cyclopentene prepared in accordance with Referential Example 3 (having a number average molecular weight of 2,800 and a weight average molecular weight of 4,800 and containing 3% of a high-molecular-weight polymer having a molecular weight of at least 20,000) was used as the admixture. The results were much the same as those obtained in Run No. 1 of Example 1.

REFERENTIAL EXAMPLE 5

Water (300 parts) was added to 100 parts of the copolymer (III) obtained in Referential Example 1, and with stirring, 5.5 parts of calcium hydroxide was gradually added. Then, 53.1 parts of sodium hydroxide was gradually added to the solution, and the mixture was stirred to give an aqueous solution of the metal salt of the copolymer (III) [the salt is designated at (III-1)]. The properties of the copolymer salt (III-1) are shown in Table 6.

REFERENTIAL EXAMPLE 6

An aqueous solution of a copolymer salt (III-2) was obtained in the same way as in Referential Example 5 except that 24.6 parts of calcium hydroxide and 32.4 parts of sodium hydroxide were used. The properties of the copolymer salt (III-2) are shown in Table 6.

REFERENTIAL EXAMPLE 7

An aqueous solution of a copolymer salt (III-3) was prepared in the same way as in Referential Example 5 except that 59 parts of sodium hydroxide was used while calcium hydroxide was not used. The properties of the copolymer salt (III-3) are shown in Table 6.

REFERENTIAL EXAMPLE 8

An aqueous solution of a copolymer salt (III-4) was prepared in the same way as in Referential Example 5 except that 6.2 parts of magnesium carbonate and 33.4 parts of sodium hydroxide were used. The properties of the copolymer salt (III-4) are shown in Table 6.

TABLE 6

| Salt composition of the copolymer salt (*) | Copolymer salt | | | |
|---|---|---|---|---|
| | (III-1) | (III-2) | (III-3) | (III-4) |
| Calcium (Ca$^{2+}$) | 0.10 | 0.45 | — | — |
| Sodium (Na$^+$) | 0.90 | 0.55 | 1.00 | 0.90 |
| Magnesium (Mg$^{2+}$) | — | — | — | 0.10 |

(*): Equivalents of the inorganic salt per equivalent of the carboxyl groups of the copolymer.

EXAMPLE 6

The properties of the copolymer salts obtained in Referential Examples 5 to 8 as a hydraulic cement admixture were evaluated under the same mortar test conditions as described in Example 1. The results are shown in Table 7.

TABLE 7

| Run No. | Admixture | Amount of the admixture (solids, %) | Flow value (mm) (*2) Immediately after | 30 min. later | 60 min. later | Amount of air (%) Immediately after | 60 min. later | Compression strength (kg/cm$^2$) (*3) 3 days later | 28 days later |
|---|---|---|---|---|---|---|---|---|---|
| Invention | | | | | | | | | |
| 1 | Copolymer salt (III-1) | 0.17 | 230 | 224 | 218 | 4.3 | 3.6 | 294 | 495 |
| 2 | Copolymer salt (III-2) | 0.15 | 229 | 225 | 220 | 4.0 | 3.5 | 296 | 498 |
| 3 | Copolymer salt (III-3) | 0.20 | 230 | 220 | 210 | 4.2 | 3.5 | 295 | 493 |
| 4 | Copolymer salt (III-4) | 0.20 | 232 | 221 | 209 | 4.2 | 3.4 | 292 | 490 |
| Comparison | | | | | | | | | |
| 5 | Not added | — | 170 | — | — | 1.3 | — | 286 | 480 |
| 6 | Commercial (*1) | 0.50 | 229 | 180 | — | 4.5 | 2.8 | 290 | 483 |

(*1), (*2) and (*3) are the same as the footnote to Table 3.

It is seen from Table 7 that when a sodium salt and a calcium salt are used in combination, better workability can be obtained over a longer period of time in a smaller amount than in the case of using the sodium salt alone.

EXAMPLE 7

The properties of the copolymer salts (III-1) and (III-2) were evaluated in a high strength concrete formulation under the same testing conditions as in Example 2. The results are shown in Table 8.

TABLE 8

| Run No. | Admixture | Amount of the admixture (solids, %) | Slump (cm) Immediately after | Slump (cm) 30 min. later | Slump (cm) 60 min. later | Amount of air (%) Immediately after | Amount of air (%) 60 min. later | Compression strength (kg/cm$^2$) 3 days later | Compression strength (kg/cm$^2$) 28 days later |
|---|---|---|---|---|---|---|---|---|---|
| Invention | | | | | | | | | |
| 1 | Copolymer salt (III-1) | 0.20 | 20.1 | 19.2 | 17.9 | 2.6 | 1.8 | 297 | 497 |
| 2 | Copolymer salt (III-2) | 0.20 | 20.2 | 19.4 | 18.2 | 2.6 | 2.0 | 298 | 496 |
| Comparison | | | | | | | | | |
| 3 | Commercial (*) | 0.55 | 20.3 | 13.3 | 9.5 | 2.1 | 1.8 | 293 | 491 |

(*): Same as footnote (*1) to Table 3.

EXAMPLE 8

The properties of the copolymer salts (III-1) and (III-2) were evaluated in a general concrete formulation under the same conditions as in Example 3. The results are shown in Table 9.

TABLE 9

| Run No. | Admixture | Amount of the admixture (solids, %) | Slump (cm) | Amount of air (%) | Compression strength (kg/cm$^2$) 3 days later | Compression strength (kg/cm$^2$) 28 days later |
|---|---|---|---|---|---|---|
| Invention | | | | | | |
| 1 | Copolymer salt (III-1) | 0.05 | 10.2 | 4.5 | 120 | 315 |
| 2 | Copolymer salt (III-2) | 0.05 | 10.5 | 4.7 | 120 | 311 |
| Comparison | | | | | | |
| 3 | Commercial (*) | 0.25 | 10.1 | 4.8 | 121 | 310 |

(*): Same as the footnote (*) to Table 5.

Table 9 shows that the admixtures in accordance with this invention show good properties when used in small amounts in the general-purpose concrete formulation.

REFERENTIAL EXAMPLE 9

One hundred parts of beta-naphthalenesulfonic acid and 20 parts of water were maintained at 85° C., and 42 parts of 37% formalin was added dropwise over 3 hours. After the addition of formalin, the mixture was stirred at 100° C. for 7 hours. During this time, 45 parts of water was added dropwise. The condensed product was limed and treated with sodium to form an aqueous solution of the sodium salt of a naphthalenesulfonic acid/formaldehyde condensate containing 8.5% of a mononuclear product [the water-soluble salt is designated (V-1)].

REFERENTIAL EXAMPLE 10

One hundred parts of 98% concentrated sulfuric acid was added to 100 parts of creosote oil (JIS Standard No. 4), and the mixture was reacted at 100° C. for 3.5 hours. Water (20 parts) was added, and while the mixture was stirred at 60° C., 25 parts of 37% formalin was added dropwise over 2 hours. After the addition, the mixture was further reacted for 5 hours. During this time, 45 parts of water was added dropwise. The resulting condensation product was limed and treated with sodium in a customary manner to obtain an aqueous solution of the sodium salt of a formalin condensate of sulfonated creosote oil [the water-soluble salt is designated as (V-2)].

REFERENTIAL EXMAMPLE 11

In a separable flask, 126 parts of melamine, 40.5 parts of phenol and 400 parts of 37% formalin were mixed and reacted at 80° C. When the reaction mixture became transparent, 90 parts of sodium sulfite, 74 parts of sodium hydrogen sulfite and 200 parts of water were put at 60° C. The mixture was again heated to 80° C., and stirred for 2 hours. The mixture was cooled to 50° C., and sulfuric acid was added to adjust the pH of the mixture to 4.5. The mixture was then reacted at 50° C. for 5 hours. Sodium hydroxide was added to adjusted the pH of the reaction mixture to 10.0, and the desired water-soluble salt (VI-1) was obtained.

EXAMPLE 9

The aromatic compound sulfonic acid salts obtained in Referential Examples 9 and 10 and the sodium salts of the copolymers obtained in Referential Examples 1, 3 and 4 were subjected to the same mortar test as in Example 1. The results ae shown in Table 10.

TABLE 10

| Run No. | Admixture | Mixing proportions (%) | Amount of the admixture (solids, %) | Flow value (mm) (*1) | | | Amount of air (%) | | Compression strength (kg/cm²) (*2) | |
|---|---|---|---|---|---|---|---|---|---|---|
| | | | | Immediately after | 30 min. later | 60 min. later | Immediately after | 60 min. later | 3 days later | 28 days later |
| Invention | | | | | | | | | | |
| 1 | Water-soluble salt | 70/30 | 0.30 | 230 | 220 | 210 | 4.3 | 4.0 | 291 | 479 |
| 2 | V-1/copolymer (III) | 30/70 | 0.25 | 231 | 228 | 225 | 4.7 | 4.5 | 293 | 480 |
| 3 | Water-soluble salt | 70/30 | 0.30 | 231 | 221 | 210 | 4.7 | 4.2 | 289 | 490 |
| 4 | V-1/copolymer (IV) | 30/70 | 0.25 | 229 | 228 | 224 | 4.5 | 4.3 | 290 | 490 |
| 5 | Water-soluble salt | 70/30 | 0.30 | 231 | 223 | 209 | 4.9 | 4.5 | 291 | 479 |
| 6 | V-2/copolymer (III) | 30/70 | 0.25 | 230 | 228 | 225 | 4.9 | 4.7 | 291 | 479 |
| Comparison | | | | | | | | | | |
| 7 | Not added | — | — | 170 | — | — | 1.3 | — | 286 | 460 |
| 8 | Water-soluble salt V-1 | — | 0.60 | 229 | 170 | — | 4.5 | 2.0 | 289 | 470 |
| 9 | Water-soluble salt V-2 | — | 0.65 | 229 | 175 | — | 4.7 | 2.1 | 287 | 468 |
| 10 | Copolymer (I) | — | 0.45 | 229 | 190 | 170 | 4.7 | 3.8 | 290 | 481 |
| 11 | Water-soluble salt V-1/copolymer (I) | 70/30 | 0.40 | 229 | 209 | 170 | 4.5 | 2.8 | 291 | 479 |

(*1) and (*2): Same as the footnotes (*2) and (*3) to Table 3.

It is seen from Table that the admixtures in accordance with this invention can give better workability over a longer period of time when used in smaller amounts than in the case of using the admixture of U.S. Pat. No. 4,125,410 (Run No. 1), and the compression strength of a hardended product from the cement composition of this invention is equivalent to that obtained by the latter.

EXAMPLE 10

The mixtures of the water soluble salts (V-1) and the sodium salt of the copolymer (III) were tested in a high strength concrete formulation in accordance with the same testing conditions as in Example 2. For comparison, the mixture of the water-soluble salt (V-1) and the Na salt of the copolymer (I) was also evaluated in the same way. The results are shown in Table 11.

TABLE 11

| Run No. | Admixture | Mixing proportions (%) | Amount of the admixture (solids, %) | Slump (cm) | | | Amount of air (%) | | Compression strength (kg/cm²) | |
|---|---|---|---|---|---|---|---|---|---|---|
| | | | | Immediately after | 30 min. later | 60 min. later | Immediately after | 60 min. later | 7 days later | 28 days later |
| Invention | | | | | | | | | | |
| 1 | Water-soluble salt V-1/copolymer (III) | 80/20 | 0.35 | 20.3 | 18.7 | 17.9 | 2.5 | 2.0 | 348 | 495 |
| 2 | Water-soluble salt V-1/copolymer (III) | 50/50 | 0.20 | 20.1 | 19.0 | 18.3 | 2.7 | 2.1 | 345 | 494 |
| 3 | Water-soluble salt V-1/copolymer (III) | 30/70 | 0.25 | 20.1 | 19.3 | 18.7 | 2.5 | 2.1 | 346 | 494 |
| 4 | Water-soluble salt V-1/copolymer (III) | 20/80 | 0.33 | 20.4 | 19.6 | 19.2 | 2.4 | 2.0 | 344 | 495 |
| Comparison | | | | | | | | | | |
| 5 | Water-soluble salt V-1 | — | 0.55 | 20.0 | 13.3 | 9.8 | 2.1 | 1.8 | 345 | 491 |
| 6 | Copolymer (I) | — | 0.44 | 20.0 | 16.8 | 11.0 | 2.8 | 1.7 | 344 | 490 |
| 7 | Water-soluble salt V-1/Copolymer (I) | 70/30 | 0.40 | 20.1 | 16.5 | 13.0 | 2.1 | 1.8 | 345 | 494 |

EXAMPLE 11

The same mortar test as in Example 9 was conducted except that the melaminesulfonic acid salt formalin condensate as prepared in Referential Example 11 was used. The results are shown in Table 12.

TABLE 12

| Run No. | Admixture | Mixing proportions (%) | Amount of the admixture (solids, %) | Flow value (mm) (*1) | | | Amount of air (%) | | Compression strength (kg/cm²) (*2) | |
|---|---|---|---|---|---|---|---|---|---|---|
| | | | | Immediately after | 30 min. later | 60 min. later | Immediately after | 60 min. later | 3 days later | 28 days later |
| Invention | | | | | | | | | | |
| 1 | Water-soluble salt | 70/30 | 0.50 | 230 | 220 | 200 | 4.3 | 4.0 | 291 | 490 |
| 2 | VI-1/copolymer (III) | 30/70 | 0.25 | 231 | 225 | 210 | 4.7 | 4.5 | 291 | 489 |
| 3 | Water-soluble salt | 70/30 | 0.50 | 231 | 221 | 203 | 4.7 | 4.2 | 290 | 490 |
| 4 | VI-1/copolymer (IV) | 30/70 | 0.25 | 229 | 228 | 210 | 4.5 | 4.3 | 290 | 492 |
| Comparison | | | | | | | | | | |
| 5 | Not added | — | — | 170 | — | — | 1.3 | — | 286 | 460 |
| 6 | Water-soluble salt VI-1 | — | 0.95 | 229 | 170 | — | 4.5 | 2.0 | 289 | 470 |

TABLE 12-continued

| Run No. | Admixture | Mixing proportions (%) | Amount of the admixture (solids, %) | Flow value (mm) (*1) Immediately after | 30 min. later | 60 min. later | Amount of air (%) Immediately after | 60 min. later | Compression strength (kg/cm²) (*2) 3 days later | 28 days later |
|---|---|---|---|---|---|---|---|---|---|---|
| 7 | Water-soluble salt VI-1/copolymer (I) | 70/30 | 0.60 | 230 | 210 | 170 | 4.7 | 3.8 | 289 | 470 |

(*1): Same as the footnote (*2) to Table 3.
(*2) Same as the footnote (*3) to Table 3.

It is seen from Table 12 that the admixtures in accordance with this invention can give better workability over a longer period of time when used in smaller amounts than the admixture of U.S. Pat. No. 4,125,410 (Run No. 7), and the equivalent results can be obtained in regard to the compression strength of a hardened product.

EXAMPLE 12

The mixtures of the water-soluble salt (VI-1) and the sodium salt of the copolymer (III) was evaluated in a high strength concrete formulation under the same conditions as in Example 2. For comparison, the mixture of the water-soluble salt VI-1 and the sodium salt of the copolymer (I) was also evaluated in the same way. The results are shown in Table 13.

TABLE 13

| Run No. | Admixture | Mixing proportions (%) | Amount of the admixture (solids, %) | Slump (cm) Immediately after | 30 min. later | 60 min. later | Amount of air (%) Immediately after | 60 min. later | Compression strength (kg/cm²) 7 days later | 28 days later |
|---|---|---|---|---|---|---|---|---|---|---|
| Invention | | | | | | | | | | |
| 1 | Water-soluble salt V-1/copolymer (III) | 80/20 | 0.60 | 20.3 | 18.7 | 15.3 | 2.5 | 2.0 | 348 | 495 |
| 2 | Water-soluble salt V-1/copolymer (III) | 50/50 | 0.30 | 20.1 | 19.0 | 16.7 | 2.7 | 2.1 | 346 | 496 |
| 3 | Water-soluble salt V-1/copolymer (III) | 30/70 | 0.25 | 20.1 | 19.3 | 17.7 | 2.5 | 2.1 | 346 | 494 |
| 4 | Water-soluble salt V-1/copolymer (III) | 20/80 | 0.20 | 20.4 | 19.6 | 18.0 | 2.4 | 2.0 | 345 | 495 |
| Comparison | | | | | | | | | | |
| 5 | Water-soluble salt VI-1 | — | 1.50 | 20.0 | 13.3 | 9.8 | 2.1 | 1.8 | 345 | 495 |
| 6 | Copolymer (I) | — | 0.44 | 20.0 | 16.8 | 11.0 | 2.8 | 1.7 | 344 | 490 |
| 7 | Water-soluble salt VI-1/Copolymer (I) | 70/30 | 0.90 | 20.1 | 18.5 | 11.0 | 2.5 | 2.1 | 345 | 494 |

EXAMPLE 13

The same mortar test as in Example 9 was conducted except that a ligninsulfonate salt was used instead of the aromatic compound sulfonic acid salt used in Example 9. The results are shown in Table 14.

TABLE 14

| Run No. | Admixture | Mixing proportions (%) | Amount of the admixture (solids, %) | Flow value (mm) (*1) Immediately after | 30 min. later | 60 min. later | Amount of air (%) Immediately after | 60 min. later | Compression strength (kg/cm²) (*2) 7 days later | 28 days later |
|---|---|---|---|---|---|---|---|---|---|---|
| Invention | | | | | | | | | | |
| 1 | Water-soluble salt VII-1(*3)/copolymer | 70/30 | 0.35 | 211 | 205 | 197 | 4.3 | 4.3 | 343 | 490 |
| 2 | (III) | 30/70 | 0.30 | 211 | 207 | 197 | 4.3 | 4.3 | 340 | 480 |
| 3 | Water-soluble salt VII-1/copolymer (IV) | 70/30 | 0.35 | 210 | 205 | 193 | 4.3 | 4.9 | 340 | 488 |
| 4 | | 30/70 | 0.30 | | | | | | | |
| 5 | Water-soluble salt VII-2(*4)/copolymer | 70/30 | 0.35 | 210 | 203 | 187 | 4.5 | 4.3 | 339 | 480 |
| 6 | (III) | 30/70 | 0.30 | 210 | 204 | 185 | 4.7 | 4.4 | 345 | 491 |
| Comparison | | | | | | | | | | |
| 7 | Water-soluble salt VII-2/copolymer (IV) | 70/30 | 0.35 | 209 | 202 | 185 | 4.8 | 4.6 | 339 | 485 |
| 8 | | 30/70 | 0.30 | 210 | 203 | 185 | 4.3 | 4.2 | 339 | 483 |
| 9 | Water-soluble salt VII-1/copolymer (I) | 80/20 | 0.55 | 210 | 195 | 175 | 4.8 | 4.0 | 339 | 479 |
| 10 | Water-soluble salt | 80/20 | 0.80 | 211 | 190 | 170 | 4.5 | 4.0 | 340 | 481 |

TABLE 14-continued

| Run No. | Admixture | Mixing proportions (%) | Amount of the admixture (solids, %) | Flow value (mm) (*1) Immediately after | 30 min. later | 60 min. later | Amount of air (%) Immediately after | 60 min. later | Compression strength (kg/cm²) (*2) 7 days later | 28 days later |
|---|---|---|---|---|---|---|---|---|---|---|
| | VII-2/copolymer (I) | | | | | | | | | |

(*1): Same as the footnote (*2) to Table 3.
(*2): Same as the footnote (*3) to Table 3.
(*3): A sulfite pulp spent liquor (composition: sugar as pentose 17.4%, substances having a molecular weight of not more than 2,000 55%, substances having a molecular weight of at least 10,000 22%) was ultrafiltered by using a membrane having a separation limit molecular weight of 6,000. The resulting dispersing agent contained 1.5% of sugards as pentose, 20% of substances having a molecular weight of not more than 2,000 and 42% of substances having a molecular weight of at least 10,000.
(*4): Commercial ligninsulfonate-type AZ water-reducing agent (POZZOLITH L, Nisso Master Builders Co., Ltd.).

(*1): Same as the footnote (*2) to Table 3.
(*2): Same as the footnote (*3) to Table 3.
(*3): A sulfite pulp spent liquor (composition: sugar as pentose 17.4%, substances having a molecular weight of not more than 2,000 55%, substances having a molecular weight of at least 10,000 22%) was ultrafiltered by using a membrane having a separation limit molecular weight of 6,000. The resultlng dispersing agent contained 1.5% of sugards as pentose, 20% of substances having a molecular weight of not more than 2,000 and 42% of substances having a molecular weight of at least 10,000.
(*4): Commerical ligninsulfonate-type AZ water-reducing agent (POZZOLITH 5L, Nisso Master Builders Co., Ltd.).

It is seen from Table 14 that the admixtures in accordance with this invention give better workability over a longer period of time when used in smaller amounts than the admixtures of Japanese Patent Publication No. 50740/1982 (Run Nos. 9 and 10), and equivalent results can be obtained in the compression strnegth of a hardened product.

EXAMPLE 14

The mixtures of the water-soluble salt (VII-1) and the sodium salt of the copolymer (III) were evaluated in a general concrete formulation under the same conditions as in Example 13. For comparison, the mixture of the water-soluble salt (VII-1) and the sodium salt of the copolmmer (I) was evaluated in the same way as above. The results are shown in Table 15.

smaller amounts that the conventional combined admixtures.

What is claimed is:

1. A hydraulic cement composition comprising hydraulic cement and a water soluble copolymer selected from the group consisting of (1) water soluble copolymer and (2) water soluble salts of copolymers, said copolymer having more than 60 up to 85 mole % of an alpha, beta-unsaturated dicarboxylic acid and less than 40 down to 15 mole % of an olefin, and said copolymer having a number average molecular weight of 300 to 10,000 and containing not more than 10% by weight of a high-molecular-weight polymer having a molecular weight of at least 20,000.

2. The composition of claim 1 wherein the proportion of the copolymer or its water-soluble salt is from 0.01 to 3% by weight based on the weight of the hydraulic cement.

3. The composition of claim 2 wherein the water-soluble salt is an alkaline metal salt, an alkaline earth metal salt, an ammonium salt, an amine salt or a combination of these.

4. The composition of claim 2 wherein the water-soluble salt is a combination of 1 equivalent of an alkali metal and 0.05 to 1 equivalent of a calcium salt.

5. The composition of claim 1 wherein the copolymer has a weight average molecular weight (Mw)/number average molecular weight (Mn) ratio (Mw/Mn) of not more than 2.0.

6. The composition of claim 1 wherein the olefin has 2 to 10 carbon atoms.

TABLE 15

| Run No. | Admixture | Mixing proportions (%) | Amount of the admixture (solids, %) | Slump (cm) Immediately after | 30 min. later | 60 min. later | Amount of air (%) Immediately after | 60 min. later | Compression strength (kg/cm²) 7 days later | 28 days later |
|---|---|---|---|---|---|---|---|---|---|---|
| Invention | | | | | | | | | | |
| 1 | Water-soluble salt VII-1/copolymer (III) | 70/30 | 0.09 | 10.0 | 9.8 | 9.0 | 4.7 | 4.6 | 216 | 311 |
| 2 | Water-soluble salt VII-1/copolymer (III) | 50/50 | 0.07 | 10.5 | 9.8 | 9.3 | 4.5 | 4.4 | 215 | 310 |
| 3 | Water-soluble salt VII-1/copolymer | 30/70 | 0.07 | 10.3 | 9.5 | 9.0 | 4.5 | 4.5 | 216 | 312 |
| Comparison | | | | | | | | | | |
| 4 | Water-soluble salt VII-1/copolymer (III) | 20/80 | 0.08 | 10.3 | 9.7 | 9.2 | 4.8 | 4.7 | 217 | 311 |
| 5 | Water-soluble salt VII-1/copolymer (I) | 80/20 | 0.13 | 10.1 | 8.3 | 6.0 | 4.8 | 4.0 | 216 | 310 |

It is seen from Table 15 that the combined admixtures in accordance with this invention show good slump retention and air entraining properties when used in 7. The composition of claim 6 wherein the olefin is an aliphatic olefin or a cycloolefin each having 4 to 6 carbon atoms.

8. The composition of claim 1 wherein the copolymer is composed of 65 to 80 mole % of the alpha, beta-unsaturated dicarboxylic acid and 35 to 20 mole % of the olefin.

9. The composition of claim 1 which further comprises an aromatic sulfonic acid salt-type admixture, a melaminesulfonic acid/formaldehyde condensate-type admixture, and/or a ligninsulfonic acid-type admixture.

10. The composition of claim 9 wherein the proportion of the additional admixture is 5 to 95% based on the total weight of the copolymer or its water-soluble salt and the admixture.

11. The hydraulic cement composition of claim 1 wherein the dicarboxylic acid is at least one of maleic acid, itaconic acid, citraconic acid and the anhydrides thereof.

12. The hydraulic cement composition of claim 1 wherein the dicarboxylic acid is maleic acid or anhydride.

13. The hydraulic cement composition of claim 1 wherein the olefin is $C_5$ aliphatic olefin or $C_5$ cycloolefin.

14. The hydraulic cement composition of claim 1 wherein the copolymer or its water soluble salt is present in an amount of 0.05 to 1 percent by weight.

15. The hydaulic cement composition of claim 1 wherein said copolymer has a number average molecular weight of 1,000 to 8,000.

16. A hydraulic cement composition comprising hydraulic cement and 0.05 to 1% by weight of a water soluble copolymer of 65 to 80 mole percent of maleic anhydride or acid and 35 to 20 mole percent of a $C_5$ aliphatic olefin or $C_5$ cycloolefin or water soluble salt thereof, said copolymer having a number average molecular weight of 1000 to 8000 and containing not more than 10% by weight of a high molecular weight polymer having a molecular weight of at least 20,000.

17. A hydraulic cement composition comprising hydraulic cement and a water soluble salt of a copolymer having more than 60 up to 85 mole percent of an alpha, beta-unsaturated dicarboxylic acid and less than 40 down to 15 mole percent of an olefin, said copolymer having a number average molecular weight of 300 to 10,000 and containing not more than 10 percent by weight of a high molecular weight polymer having a molecular weight of at least 20,000.

18. The hydraulic cement composition of claim 17 wherein the olefin is an aliphatic olefin or a cycloolefin each having 4–6 carbon atoms.

19. The hydraulic cement composition of claim 17 wherein the copolymer is composed of 65–80 moles percent of the alpha, beta-unsaturated dicarboxylic acid and 35–20 moles percent of the olefin.

20. The hydraulic cement composition of claim 17 wherein said copolymer has a number average molecular weight of 1,000 to 8,000.

21. The hydraulic cement composition of claim 17 wherein the dicarboxylic acid is at least one of maleic acid, itaconic acid, citraconic acid and the anhydrides thereof.

22. The hydraulic cement composition of claim 17 wherein the dicarboxylic acid is maleic acid or anhydride.

23. The hydraulic cement composition of claim 17 wherein said copolymer is present in an amount of 0.05 to 1 percent by weight.

24. A hydraulic cement admixture composed of a water soluble copolymer selected from the group consisting of (1) water soluble copolymer and (2) water soluble salts of copolymers, said copolymer having more than 60 up to 85 mole percent of an alpha, beta-unsaturated dicarboxylic acid and less than 40 down to 15 mole percent of an olefin, and said copolymer having a number average molecular weight of from 300 to 10,000 and containing not more than 10 percent by weight of a high molecular weight polymer having a molecular weight of at least 20,000.

25. The hydraulic cement admixture of claim 24 wherein the said copolymer has a number average molecular weight of 1,000 to 8,000.

* * * * *